Figure 8:
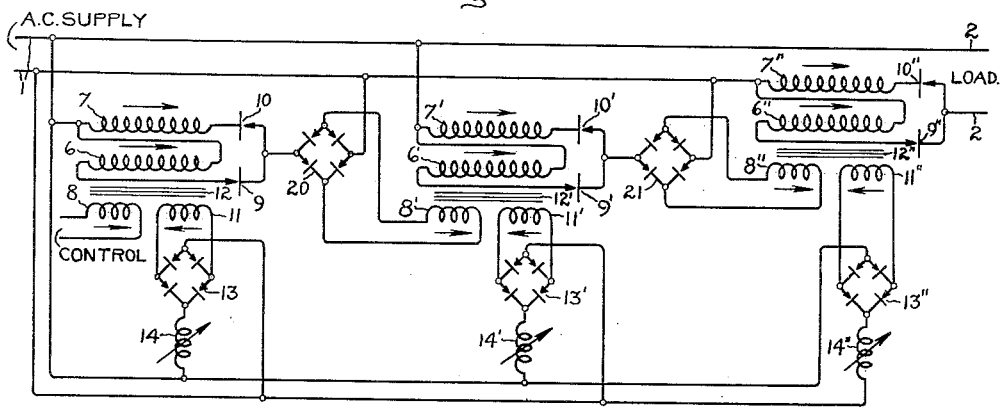

Aug. 8, 1939. M. A. EDWARDS 2,169,093
ELECTRICAL CONTROL SYSTEM
Filed Jan. 2, 1937 2 Sheets-Sheet 1
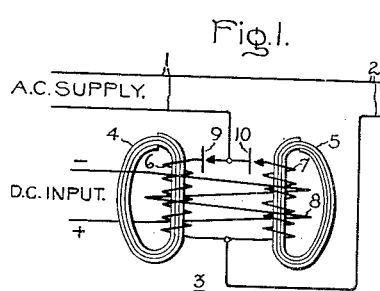
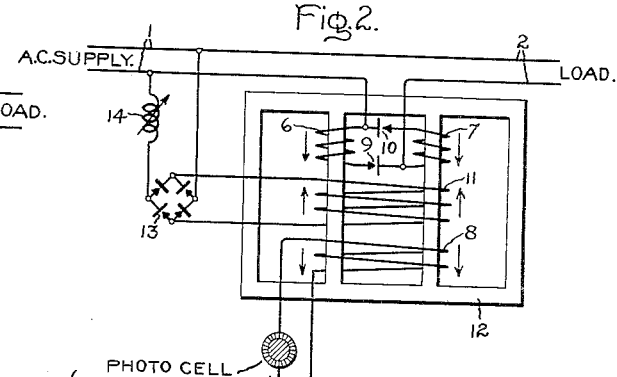
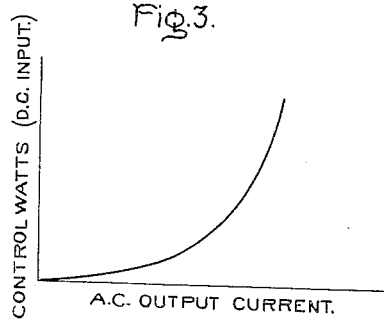
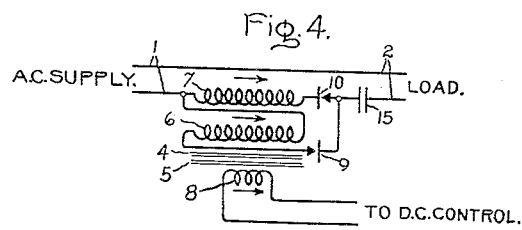
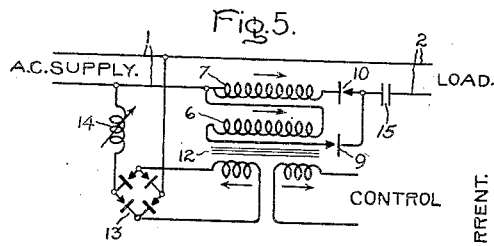
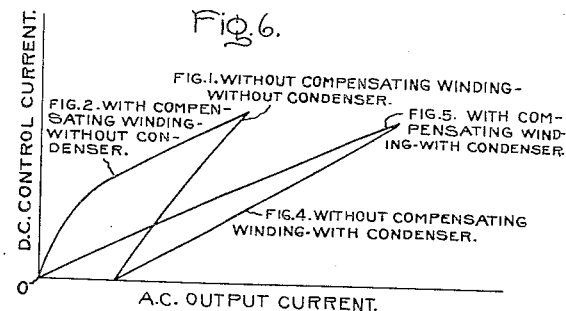
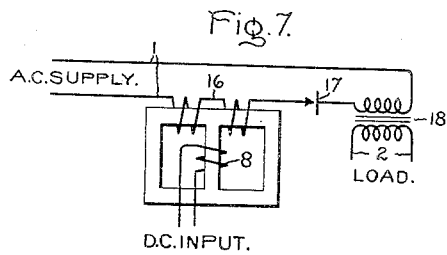
Inventor:
Martin A. Edwards,
by Harry E. Dunham
His Attorney.

Aug. 8, 1939. M. A. EDWARDS 2,169,093
ELECTRICAL CONTROL SYSTEM
Filed Jan. 2, 1937 2 Sheets-Sheet 2

Inventor:
Martin A. Edwards,
by Harry E. Dunham
His Attorney.

Patented Aug. 8, 1939

2,169,093

UNITED STATES PATENT OFFICE 2,169,093

ELECTRICAL CONTROL SYSTEM

Martin A. Edwards, Schenectady, N. Y., assignor to General Electric Company, a corporation of New York Application January 2, 1937, Serial No. 118,914

9 Claims. (Cl. 171—242)

My invention relates to electrical control systems and more particularly to improvements in magnetic amplifiers.

As its name implies, a magnetic amplifier is a device which uses magnetism to control a relatively large output quantity by means of a relatively small input quantity. A well-known example of a magnetic amplifier is a saturable core reactor.

A saturable core reactor is a device having one or more iron cores on which are wound one or more alternating current windings and on which are also wound one or more direct current control or saturating windings. When no current flows in the direct current control winding or windings, the flux in the core will be oscillating about an average value of zero. As the average value of the flux is zero, the average permeability of the core will be relatively high. This means a relatively high rate of change of flux linkages in the alternating current windings. Therefore, the self-induced voltages in the alternating current windings, and hence the reactance voltage drops therein, are relatively high. If unidirectional current is now caused to flow in the direct current control winding, the flux linking the alternating current windings will oscillate about a point whose average value is determined by the flux produced by the unidirectional control winding alone. Generally speaking, and within the range of control of most saturable core reactors, the higher the value of the average flux in the core, the lower is the permeability of the core and consequently the lower will be the rate of change of flux linking the alternating current windings. Consequently, as the unidirectional control current increases in magnitude the voltage of the alternating current windings decreases in magnitude. Therefore, if the alternating current windings are connected to a suitable substantially constant potential source of alternating current in series with a load device, the current in the load device can be controlled over a wide range by making an inverse change in the unidirectional control current.

With a conventional saturable core reactor in which separate alternating current windings on the center legs of a four-legged core are connected in parallel and a direct current control winding surrounds both center legs, I have found that the maximum power amplification obtainable is approximately 180:1. By maximum power amplification, I mean the maximum output-input ratio obtainable when the input and output values are at their maximum.

Heretofore, various arrangements have been used for increasing the power amplification of conventional reactors. One such arrangement has consisted of an auxiliary transformer or transformers for inserting voltages in the controlled circuit which compensate for the voltage drops in the alternating current windings of the reactor when its control winding carries no direct current and when its control winding carries full direct current, respectively. However, such an arrangement involves the expense of additional transforming means. Another idea has been to use a so-called feed-back or regenerative control wherein the alternating output current of the reactor is rectified and passed through an auxiliary direct current control winding on the reactor. With such an arrangement, the amount of current and energy which need be put into the main direct current control winding in order to secure full range of operation will be very much less than with an ordinary direct current saturated core reactor, but the difficulty has been that such feed-back arrangements often tend to become unstable and run away with themselves. This is because as the direct current produced flux in the core increases, the alternating output current of the reactor increases thereby in turn further increasing the direct current in the feed-back winding whereby the direct current flux in the core is further increased and this cycle tends to repeat itself until finally the core is substantially fully saturated with unidirectional flux.

In accordance with my invention I provide a novel and simple magnetic amplifier which differs in a number of fundamental particulars from an ordinary saturable core reactor type magnetic amplifier. Perhaps the most important difference is that the variable reactance windings, corresponding to the alternating current windings on a conventional saturable core reactor, never tend to produce a reversal of flux in the core with respect to the flux produced by the direct current control winding, although these variable reactance windings are adapted to be connected in an alternating current circuit and to permit alternating current to flow in that circuit. Because of this relation between the direction of the flux produced by the various windings, it is not necessary for the direct current control winding to carry a maximum current sufficiently high to prevent the variable reactance winding from reversing the flux therethrough as is the case with saturable core reactors. This means that a given amount of power can be controlled with a much smaller direct current input to the control winding and I have found that amplifications of 8000:1 are not uncommon with my amplifier.

Another important characteristic of my magnetic amplifier is that it is inherently entirely stable throughout its range of control, so that for every different value of direct current input to the saturating or control winding, there is a definite corresponding value of controlled output power or current.

My amplifier is not only suitable for use in communication circuits but it is also well adapted for use in automatic or manually operated electrical control circuits or systems, including electrical regulators of various types.

An object of my invention is to provide a new and improved electrical control system.

Another object of my invention is to provide a new and improved magnetic amplifier.

An additional object of my invention is to provide a magnetically saturable core type control device for magnetic amplifiers which is entirely stable throughout its range of control and which can produce an amplification of 8000:1.

My invention will be better understood from the following description taken in connection with the accompanying drawings and its scope will be pointed out in the appended claims.

Figure 9:
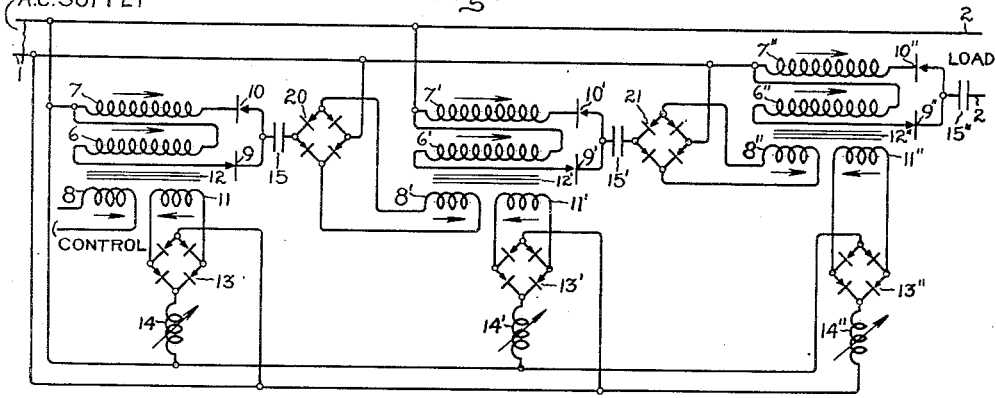
Figure 10:
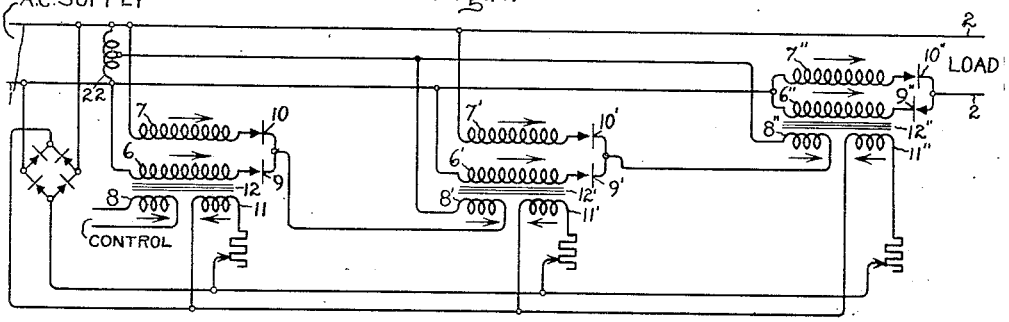

In the drawings, Fig. 1 is a diagrammatic showing of an embodiment of my invention; Fig. 2 is an improved modification provided with a compensating winding; Fig. 3 is a curve showing the relation of the input power to the output current for the modification shown in Fig. 2; Fig. 4 is a modification of Fig. 1 in which a capacitor is connected in the alternating current load circuit and is so proportioned as to neutralize the reactance of the amplifier when it is fully saturated; Fig. 5 is a corresponding modification of Fig. 2 in which a capacitance similar to that in Fig. 4 has been added to the amplifier of Fig. 2; Fig. 6 is a comparison of the input-output current characteristics of Figs. 1, 2, 4 and 5; Fig. 7 is a further modification utilizing but one variable reactance winding and one unidirectional conductor; Fig. 8 illustrates a cascaded connection of a plurality of the amplifiers shown in Fig. 2; Fig. 9 illustrates a cascaded connection of a plurality of the amplifiers shown in Fig. 5, and Fig. 10 illustrates a modified cascading circuit.

Referring now to the drawings and more particularly to Fig. 1, I have shown therein an alternating current supply circuit 1 connected to an alternating current load circuit 2 through my magnetic amplifier 3. Amplifier 3 consists of a pair of cores 4 and 5 of magnetic material, preferably of a material having a relatively high permeability. On core 4 is wound a variable reactance winding 6 and on core 5 is wound a variable reactance winding 7. Linking both cores, and preferably wound on top of the reactance windings 6 and 7, is a direct current control or input winding 8.

Reactance windings 6 and 7 are connected in parallel between the supply circuit 1 and the load circuit 2, but in series with the winding 6 is the unidirectional conducting device 9 and in series with winding 7 is a unidirectional conducting device 10. These devices, which may be of any suitable type such as conventional copper-oxide rectifiers, are reversely connected with respect to current flow in the supply and load circuits so that, for example, positive half cycles of load current flow through winding 6 and negative half cycles of load current flow through winding 7. In this manner alternating current can circulate in the supply and load circuits but only pulsating unidirectional current can flow in each of the reactance windings 6 and 7. In addition, these reactance windings are so connected or wound on their respective cores that the pulsating unidirectional fluxes which they produce are in the same direction with respect to the input winding 8. For example, as the coils are arranged in the drawings, these fluxes will be downward in the portions of the cores surrounded by the windings.

The input winding 8 is adapted to have direct current circulated therein of the polarity indicated on the drawings so that the flux produced by this winding will have the same direction in the cores 4 and 5 as the fluxes produced by the reactance windings 6 and 7.

An advantageous way of constructing the amplifier is as follows: First the coils or windings 6 and 7 are wound on suitable forms or spools and then these two coils are securely bound together by means of the winding 8 which is wrapped around them. The cores 4 and 5 are then added in the form of strips of magnetic material which are wound in and out through the openings in the coils 6 and 7 until a sufficient number of turns or loops of the core strips have been made to provide cores of suitable cross section. The ends of the core strips can then be spot-welded to the adjacent layer. With such a construction, it is unnecessary to have core punchings or laminations of different sizes for amplifiers of different sizes or ratings. The cores do not have air gaps, which is a decided advantage in saturable core type devices. The difficulty of slipping laminations on preformed coils or interleaving the laminations is done away with while all the advantages of laminated construction are retained.

The operation of Fig. 1 is as follows: By properly selecting the number of turns of the reactance windings 6 and 7 with regard to the voltage of the supply circuit 1 and the impedance of the load circuit 2, substantially all the voltage of the supply circuit can be made to appear across the reactance windings and the load circuit will be substantially deenergized, when no current flows in the direct current input or control winding 8. Thus, for example, during each positive half cycle of current the permeability of core 4 will be so high that the inductance or reactance of winding 6 will be so high that the voltage of self-inductance in this winding, or in other words the reactance voltage drop through it, will prevent the flow of all but a negligible current therethrough. For negative half cycles the same will be true of reactance winding 7.

If now direct current is caused to flow in the control winding 8, the permeability of the cores 4 and 5 will be reduced. This reduction in permeability of the cores reduces the self-induced counter voltages in the reactance windings 6 and 7 so that the reactance voltage drops across these windings are reduced and hence more current is permitted to flow into the load circuit 2 from the supply circuit 1. By increasing the direct current input to the control winding 8 until the cores 4 and 5 are saturated well beyond the knees of their respective saturization curves, the reactance of windings 6 and 7 can be reduced so far that substantially all of the supply voltage will be across the load and a very small percentage of it will be across the reactance windings 6 and 7.

I have found that the maximum input energy to winding 8, necessary to control a given amount of power in the load circuit, is very much less with the arrangement shown in Fig. 1 than it is for a conventional saturable core reactor. An explanation of this is that in the arrangement of Fig. 1, like in a feed-back controlled saturable core reactor, increases in alternating load current through the reactance windings produce corresponding increases in average unidirectional flux in the cores so that in a sense the device tends to saturate itself with unidirectional flux as the alternating load current increases. Therefore, the energy input to the control winding 8 need only be a marginal amount necessary to secure a change in reactance or saturation. However, the arrangement shown in Fig. 1 differs from a feed-back controlled saturable core reactor in that Fig. 1 is entirely stable for all values of input current to control winding 8.

An explanation of why Fig. 1 is stable and many feed-back controlled saturable core reactors are unstable is as follows:

It appears that wherever the unidirectional feed-back ampere-turns exceed the effective ampere turns of the reactance windings that instability occurs in a feed-back controlled saturable core reactor. With my amplifier it is the same current in the same winding which produces both the unidirectional saturating effect and the effective ampere turns of the reactance windings. Because of the losses in the arrangement, including hysteresis, the ratio can never reach the instability value although it is always very close to it so as inherently to give greatest sensitivity and amplification.

Another factor which increases the sensitivity and maximum amplification range of my device is that the unidirectional saturating ampere-turns never have to oppose the reactance ampere-turns. With an ordinary saturable core reactor the current in the reactance windings reverses every cycle and in order to obtain minimum reactance the maximum direct current saturating ampere turns have to be about 160% of the maximum effective alternating current ampere turns, so that the 60% difference, less losses, will be sufficient to saturate the core when the magnetomotive force of the alternating current winding is opposite in direction with respect to that of the direct current winding.

The modification shown in Fig. 2 differs from Fig. 1 in that a compensating winding 11 has been added to the device and the various windings are wound on a conventional four-legged saturable reactor type core 12.

The compensating winding 11 is a direct current winding which may be energized in any suitable manner such as from the supply circuit 1 through a suitable rectifier 13. An adjustable impedance 14 serves for adjusting or setting the amount of direct current in the compensating winding 11.

The compensating winding 11 is normally arranged to produce a magneto-motive force in opposition to the magneto-motive forces of windings 6, 7 and 8, and the strength of this magnetomotive force is such as to neutralize the magnetomotive forces of the windings 6 and 7 when no current flows in the control winding 8. This materially increases the range of control of the device because unidirectional flux in the core produced by the no-load, or maximum reactance, current in the windings 6 and 7 tends to produce some saturation in the core and consequently if this flux is bucked out or neutralized, the reactance of the windings 6 and 7 will be increased at such times as no current flows in the control winding 8.

Control winding 8 is shown by way of example as being connected to the output of a photoelectric cell. Such a device has a normal output power of the order of magnitude of a few microwatts and I have found that such a device can, through the interposition of my amplifier shown in Fig. 2, be made to control an output of the order of magnitude of watts. Except for the effect of compensating winding 11, the operation of Fig. 2 is the same as that of Fig. 1 and as direct current in the control winding 8 increases the core 12 will have its permeability progressively decreased thereby progressively decreasing the reactance of the windings 6 and 7 and progressively increasing the current in the load circuit 2.

While in Fig. 2, the compensating winding 11 has been added to a form of amplifier utilizing a conventional four-legged core 12, it will, of course, be obvious to those skilled in the art that the compensating winding 12 could also be added to an amplifier having the core arrangement shown in Fig. 1.

The circuit of Fig. 4 is similar to that of Fig. 1 except that a capacitor 15 has been inserted in series in the alternating current circuit. If this capacitor is so proportioned that its capacitive reactance is nearly the same as the inductive reactance of windings 6 and 7 when the cores 4 and 5 are fully saturated, then these reactances will almost neutralize each other so that substantially the only current limiting effect of the whole combination will be the resistance of the windings 6 and 7 and the resistance of unidirectional conducting devices 9 and 10. In this manner the range of control may be materially increased.

The arrows associated with the windings of Fig. 4 represent the directions of unidirectional magnetomotive force and flux produced by these windings.

In Fig. 5 the circuit arrangement is similar to that of Fig. 2 but a capacitor 15 has been added as in Fig. 4. The operation of the capacitor is the same as that in Fig. 4 and its presence plus the presence of the compensating winding 11 still further increases the range of control.

If series resonance is produced by the presence of capacitor 15 the arrangement will tend to be unstable and momentary application of input current to winding 8 will turn the device "on" and momentary application of reversed input current will turn the device "off". The device thus can have the characteristics of a polarized or latched-in relay.

In Fig. 6, the control characteristics of Figs. 1, 2, 4 and 5 are compared. In the characteristic of Fig. 1 wherein there is neither a compensating winding nor a capacitor, there is a considerable alternating current output current when the direct current control input is zero. As the direct control current increases, the alternating output current increases up to a predetermined value. With the characteristic for Fig. 2, in which the compensating winding is added but there is no condenser, the output current is practically zero when the control current is zero and after an initial relatively steep period in which the output current does not increase as fast as the control current the curve flattens out more than that for Fig. 1 so that the output current for unit change of input current increases faster for the circuit of Fig. 2 than with the circuit of Fig. 1. The characteristic of Fig. 4 is similar to that of Fig. 1 in that when there is no control current in the winding 8 there is still an appreciable output current in the windings 6 and 7. However, the presence of the capacitor 15 materially increases the output which can be secured for a given amount of input control current. The characteristic of Fig. 5 gives the greatest range of control of all four in that it has the maximum output corresponding to that for Fig. 4, and has the minimum output corresponding to that for Fig. 2.

In the modification shown in Fig. 7, only a single reactance winding 16 and a single unidirectional conducting device 17 are provided. The reactance winding 16 and the direct current control winding 8 are wound on any suitable core, such as on a three-legged core which minimizes transformer action between the windings. With this arrangement half-wave direct current flows in the supply circuit and the value of this current can be controlled by the current in the control winding 8, which varies the permeability of the core by saturating it with unidirectional flux. As in the previous modifications, the changes in permeability of the core change the reactance of the winding 16 and therefore its current limiting ability. An alternating load circuit 2 may be connected to the supply circuit 1 by means of a transformer 18 which will convert the pulsating direct current into alternating current of twice the frequency of the supply circuit.

In Fig. 8, three of the amplifiers of the type shown in Fig. 2 are cascaded. This is done by connecting the alternating output of the left-hand amplifier to the direct current control winding 8' of the intermediate amplifier through a full wave rectifier 20, and connecting the output of the intermediate rectifier to the control winding 8" of the last amplifier through a full wave rectifier 21.

Although only three amplifiers have been shown cascaded this may be continued indefinitely with any number of amplifiers. By means of this connection the amplification range is practically unlimited and an input of a few microwatts to the control winding 8 may be made to control a load of almost any number of kilowatts.

It should be understood that compensating windings 11, 11' and 11" bear the same relation to their associated reactance windings as is present in Fig. 2. In other words, the currents in the compensating windings 11' and 11" are not changed or increased in order to compensate for any effect produced by cascading of the amplifiers.

Fig. 9 is similar to Fig. 8 except that capacitors 15, 15' and 15" have been added to the amplifiers as in Fig. 5. In view of the previous description, the operation of this figure should be obvious.

In Fig. 10 is shown a more economical circuit in which it is possible to eliminate the full wave rectifiers 20 and 21 of Figs. 8 and 9 by adding in their place merely a single winding 22 having a mid-tap. The only other necessary change is to reverse the unidirectional conductors 10 and 10' in the left-hand and middle amplifiers. With this connection, the reactance windings of the first and second amplifiers are connected with the rectifiers 9 and 10 as bi-phase full wave rectifiers so that the output of the amplifiers is full wave rectifier direct current instead of alternating current and consequently this direct current output can be applied directly to the input windings 8' and 8" of the succeeding amplifiers.

While I have shown and described particular embodiments of my invention, it will be obvious to those skilled in the art that changes and modifications can be made in my invention and I, therefore, aim in the appended claims to cover all such changes and modifications as fall within the true spirit and scope of my invention.

What I claim as new and desire to secure by Letters Patent in the United States is:

1. In combination, a core of magnetic material, a reactance winding on said core, means for energizing said winding with half wave rectified current, a control winding on said core, means for supplying said control winding with unidirectional current, a compensating winding on said core, means for supplying said compensating winding with a substantially constant value of unidirectional current, the magnetomotive forces of said reactance and control windings being in the same direction with respect to each other and opposite in direction with respect to the magnetomotive force of said compensating winding.

2. In combination, an alternating current circuit, a magnetic amplifier having a core of magnetic material provided with a reactance winding connected in said circuit in series with a unidirectional conducting device which permits only half-wave current to flow in said winding, a direct current control winding for producing a variable unidirectional flux in said core in the same direction as the flux produced by said reactance winding and a direct current compensating winding on said core for producing a flux which is substantially equal and opposite to the flux produced by said reactance winding when substantially no current flows in said control winding.

3. In combination, an alternating current circuit, a magnetic amplifier having a core of magnetic material provided with a reactance winding connected in said circuit in series with a unidirectional conducting device which permits only half wave current to flow in said winding, a direct current control winding for producing a variable unidirectional flux in said core in the same direction as the flux produced by said reactance winding, a direct current compensating winding on said core for producing a flux which is substantially equal and opposite to the flux produced by said reactance winding when substantially no current flows in said control winding, and a full wave rectifier through which said compensating winding is energized from across said alternating current circuit.

4. In combination, a magnetic core structure of relatively high permeability, a pair of unidirectional conducting devices, a pair of windings on said core structure connected respectively in series with said unidirectional conducting devices, said windings and devices being so arranged that when one winding and its series device is connected in multiple with the other winding and its series device in an alternating current load circuit a unidirectional flux will be produced in said core while alternating current flows in said load circuit a control winding on said core, and a direct current winding for compensating for the no-load magnetizing flux in said core.

5. In combination, an alternating current circuit, a saturable core amplifier having a direct current input winding, a pair of output windings on said amplifier, a separate unidirectional conductor connected in series with each of said output windings, one of said output windings and its series connected unidirectional conductor being in parallel with the other output winding and ing connected in said alternating current circuit its series connected unidirectional conductor in such a manner that alternating current can flow in said alternating current circuit while said output windings produce unidirectional flux in said amplifier in the same direction as that produced by said control winding, and a compensating winding arranged to produce a unidirectional flux in said amplifier for neutralizing the flux produced by said output windings when there is substantially no input to said control winding.

6. In combination, an alternating current circuit, a saturable core amplifier having a direct current controllable input winding, a pair of output windings on said amplifier, a separate unidirectional conductor connected in series with each of said output windings, one of said output windings and its series connected unidirectional conductor being connected in said alternating current circuit in parallel with the other output winding and its series connected unidirectional conductor in such a manner that alternating current can flow in said alternating current circuit while said output windings produce unidirectional flux in said amplifier in the same direction as that produced by said control winding, and a capacitor connected in said alternating current circuit, said capacitor being designed so as substantially to neutralize the reactance of said output windings when said amplifier is substantially fully saturated.

7. In combination, an alternating current circuit, a saturable core amplifier having a direct current controllable input winding, a pair of output windings on said amplifier, a separate unidirectional conductor connected in series with each of said output windings, one of said output windings and its series connected unidirectional conductor being connected in said alternating current circuit in parallel with the other output winding and its series connected unidirectional conductor in such a manner that alternating current can flow in said alternating current circuit while said output windings produce unidirectional flux in said amplifier in the same direction as that produced by said control winding, a compensating winding arranged to produce a unidirectional flux in said amplifier for neutralizing the flux produced by said output windings when there is substantially no input to said control winding, and a capacitor connected in said alternating current circuit, said capacitor being so designed as substantially to neutralize the reactance of said output windings when said amplifier is substantially fully saturated.

8. In combination, an alternating current circuit, a saturable core amplifier having a direct current controllable input winding, a pair of output windings on said amplifier, a separate unidirectional conductor connected in series with each of said output windings, one of said output windings and its series connected unidirectional conductor being connected in said alternating current circuit in parallel with the other output winding and its series connected unidirectional conductor in such a manner that alternating current can flow in said alternating current circuit while said output windings produce unidirectional flux in said amplifier in the same direction as that produced by said control winding, and a compensating winding arranged to produce a unidirectional flux in said amplifier for neutralizing the flux produced by said output windings when there is substantially no input to said control winding, a rectifier, and a second saturable core amplifier similar to and cascaded with the first amplifier by connecting the input winding of the second amplifier to the output windings of the first amplifier through said rectifier.

9. In combination, a plurality of magnetic amplifiers each having direct current input terminals and alternating current output terminals, each of said amplifiers having a magnetic core structure carrying reactance windings connected in parallel between their respective alternating current output terminals through reversely connected unidirectional conducting devices, a compensating winding on each amplifier for neutralizing the no-load flux produced by its reactance windings, and connections for cascading said amplifiers.

MARTIN A. EDWARDS.

CERTIFICATE OF CORRECTION.

Patent No. 2,169,093.   August 8, 1939.

MARTIN A. EDWARDS.

It is hereby certified that error appears in the printed specification of the above numbered patent requiring correction as follows: Page 5, first column, lines 2, 3 and 4, claim 5, for "conductor be- in parallel with the other output winding and ing connected in said alternating current circuit" read conductor being connected in said alternating current circuit in parallel with the other output winding and; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.